May 19, 1931. A. C. HARDY ET AL 1,806,199
METHOD AND APPARATUS FOR COMPARING RADIANT ENERGY
Filed May 3, 1928 2 Sheets-Sheet 2
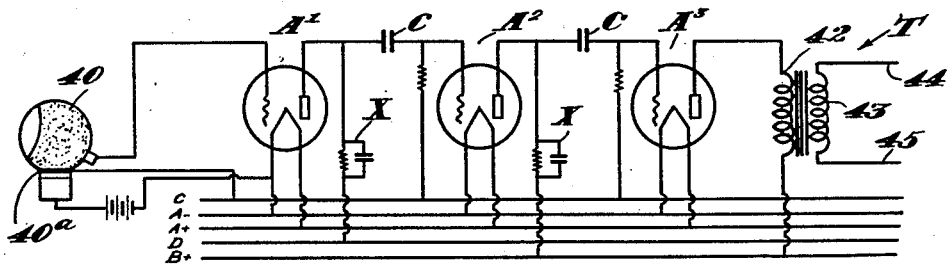
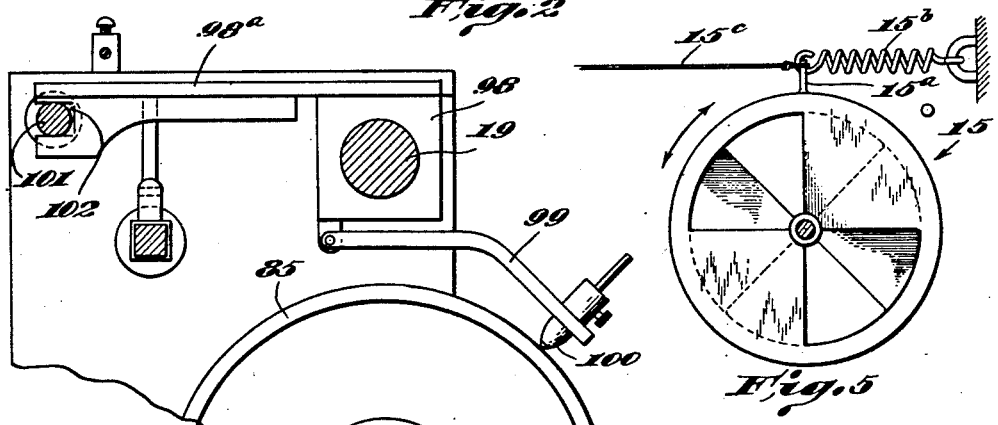
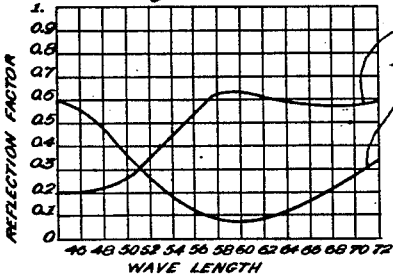
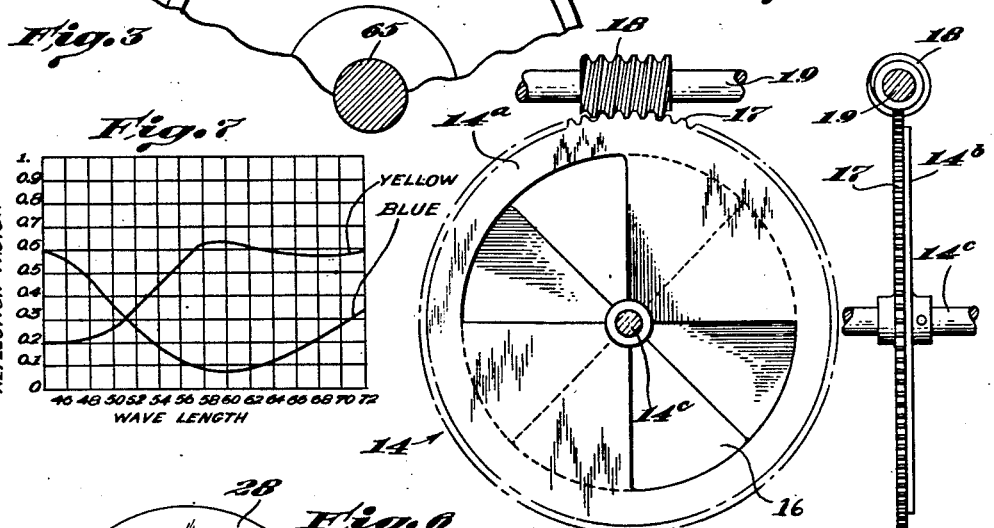
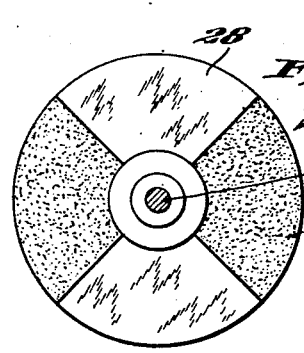
Inventors
Arthur C. Hardy
Frederick W. Cunningham
by Roberts Cushman Woodbury
Attys.

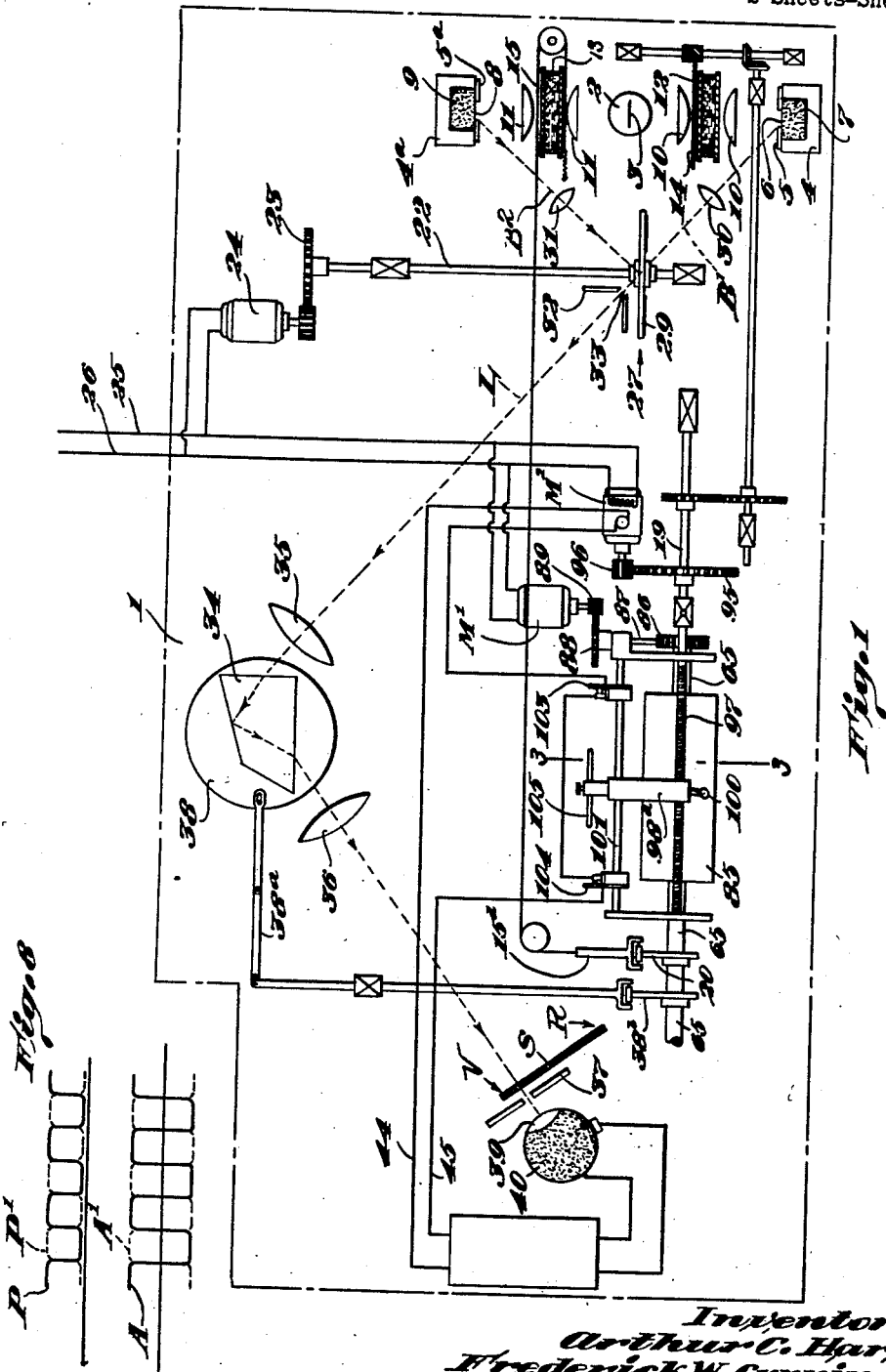

Patented May 19, 1931

1,806,199

UNITED STATES PATENT OFFICE

ARTHUR C. HARDY, OF WELLESLEY, MASSACHUSETTS, AND FREDERICK W. CUNNINGHAM, OF STAMFORD, CONNECTICUT, ASSIGNORS TO GENERAL ELECTRIC COMPANY, A CORPORATION OF NEW YORK

METHOD AND APPARATUS FOR COMPARING RADIANT ENERGY

Application filed May 3, 1928. Serial No. 274,729.

This invention pertains to a method of comparing or measuring radiant energy (of which light, heat and electricity may be cited as examples) and if desired, recording the results of such comparison or measurement, and to apparatus useful in the practice of such method, and relates to improvements in the method and apparatus disclosed in our application for Letters Patent Serial No. 195,848, filed June 1, 1927. In said application we have described our invention with particular reference to its application to the spectrophotometric analysis or comparison of color, and for convenience in description and illustration the present invention is likewise hereinafter described with reference to its application to colorimetry, but it is to be understood that in its broader aspects the present invention is applicable to other purposes and capable of embodiment in other apparatus than that here disclosed for illustration and we contemplate that other uses and apparatus of analogous or similar character fall within the scope of our invention.

As disclosed in our joint application, above referred to, we cause radiant energy from the source to be investigated to fall upon an electrical device which is highly sensitive to radiant energy of the kind to be compared or measured and through which device there flows an electric current which is dependent (in magnitude or potential or both) on the amount of such radiant energy which falls upon or is received by said device. As described in our prior application above referred to, a photoelectric cell may be the sensitive device when light energy is to be measured or compared, and for color measurement the light from the source is dispersed to form an extended spectrum band to which the cell is exposed, either at a selected point or points or progressively from one end of the band to the other. For color comparison, as fully described in our aforesaid application, light from two sources, one a sample to be tested and the other preferably a standard of comparison is delivered in rapidly alternating flashes to the dispersing means, and the photoelectric cell is exposed alternately to light of corresponding wave length from each of the sources. So long as the light at such predetermined wave length from the two sources be of different intensity, a pulsating current is set up in the photoelectric cell, but when the intensity of light at the selected wave length arriving at the two sources becomes equal, the current in the cell becomes steady. As disclosed in our aforesaid application the pulsating current from the cell is amplified by the use of suitable devices and this current is then rectified and the rectified current employed in operating mechanical relays controlling suitable motor mechanism for actuating indicators, recorders or other devices by means of which the observer is apprised of findings of the mechanism.

In accordance with the present invention, we provide a more simple arrangement than that disclosed in our aforesaid application, and in the simplified apparatus rectification of the current and the use of relays is avoided and the amplified oscillatory current from the photoelectric cell is sent through the primary of a transformer, thereby producing alternating current in the secondary of the transformer which is used directly for actuating or controlling the operation of the indicator, recorder or the like.

To this end we employ a reversible electric motor for actuating the recording element (for example, a stylus) supplying alternating current at, for example, sixty cycles from any suitable and reliable source to the field of the motor, and supplying the armature or rotor of the motor with the alternating current from the secondary of the transformer.

We employ an electric motor, preferably supplied from the same source of alternating current as the field of the record-driving motor, to operate the means for delivering alternate flashes of light from the two sources to the cell, so that such flashes are produced synchronously and at the same rate, for example, sixty per second, as the rate of change in direction of the alternating current. When the light flashes from the two sources are not of the same intensity, the current in the photoelectric cell varies with each successive flash, and the current in the plate circuit of the amplifier likewise pulsates rapidly. These variations in the current passing through the primary of the transformer give rise to an E. M. F. in the secondary of the transformer which is in one direction while the plate current in the last amplifier tube is increasing and in the opposite direction while the plate current is decreasing. Since, in the example chosen for illustration, the flashes take place at sixty per second, the current in the secondary of the transformer is a sixty-cycle current. By proper adjustment of the parts, this current which passes through the armature of the driving motor, as above described, will be in phase with the current in the field so long as light from the standard, for example, is more intense than that from the sample being tested, and so long as this condition exists, the motor will run in one direction. If, however, the reverse condition prevails, and the light from the sample becomes more intense, then the current from the transformer will be shifted in phase, thereby causing the drive motor for the recording means to turn in the opposite direction. Whenever light of equal intensity from the standard and sample is delivered to the photoelectric cell, the current in the latter ceases to pulsate and is no longer amplified and the transformer thus fails to furnish current to the motor armature so that the latter stops.

The drive motor may be employed as in our aforesaid application to move an indicating element or a recording device, for example, a stylus which may cooperate with a drum or other record element which is driven at a uniform speed by suitable means. The same means which actuates the drum may be employed for progressively exposing the photoelectric cell to different parts of the spectrum band, either by continuous movement or step by step, while the motor which actuates the stylus also controls the relative intensity of illumination of the standard and sample, as for example, by actuating a shutter disposed between the source of illumination and the standard or sample.

If a silvered mirror be employed in producing the flashes of light from the sample or standard it may be necessary to compensate for the non-uniform reflecting power of such a silvered surface at different wave lengths by employing a shutter or other device for regulating the light between the lamp and the standard or sample, such shutter being operated by a suitable cam or the like which is driven in consonance with the recording-receiving drum.

So far as the broad underlying principle of the invention is concerned, we regard it as independent of the specific character of the sensitively responsive device, providing the latter have the requisite sensitiveness and rapidity of response to the particular type of energy under investigation; as independent of any specific means for shifting the sensitive device relatively to the spectrum whether such shifting be continuous or step by step; as independent of the particular means employed for varying the relative intensity of illumination of the sample and standard; as independent of the means for producing the intermittent flashes of energy from the standard and sample; and independent of the relative positions of the sample, the standard and the lamp (if a lamp be necessary for illuminating the standard and sample);—but we have herein chosen to illustrate the invention, by way of example, as embodied in a specific mechanism of a simple, reliable and convenient type and we herein claim the invention both broadly and in this specific embodiment but without intending to limit ourselves to the specific means herein illustrated except as defined by the appended claims.

In the drawings,

Fig. 1 is a diagrammatic plan view, with certain parts broken away, illustrating the complete apparatus and showing certain of the electrical circuits;

Fig. 2 is an enlarged detail illustrating one arrangement of the amplifier circuits useful in connection with the apparatus of Fig. 1;

Fig. 3 is a fragmentary vertical section, to large scale, substantially on the line 3—3 of Fig. 1;

Fig. 4 is a fragmentary front elevation, illustrating shutter means for controlling the intensity of illumination of the standard;

Fig. 4a is an edge elevation, partly in section, of the parts shown in Fig. 4;

Fig. 5 is a front elevation of shutter means for controlling the illumination of the sample;

Fig. 6 is a front elevation of the flash-producing disk, with its shaft in section;

Fig. 7 is a diagram illustrating the type of record which is produced by the apparatus herein disclosed; and Fig. 8 is a diagram illustrating the shift in phase of an alternating current resulting from reversal of the relative intensity of light from the standard and sample.

Referring to the drawings, the numeral 1 designates a suitable base which is here shown as carrying the various elements of the apparatus, together with the wiring forming the electrical circuits, but it is to be understood that the arrangement shown in Fig. 1 is merely illustrative and that various parts of the apparatus may be mounted upon separate supports and may, and preferably will in some instances, be widely separated.

Upon the base 1 we mount a light source 2, conveniently an incandescent lamp, preferably having a flat filament 3 which is disposed in the plane indicated in Fig. 1. At one side of the lamp 2 we provide a support 4 adapted to hold a sample to be tested or a standard of comparison. We have here illustrated this support 4 as holding the standard of comparison. This support preferably is provided with a shield 5 having an aperture through which the substantially flat vertical surface 6 of the standard 7 is exposed to the light of the lamp 2. We find that for color comparison a block of magnesium carbonate ($MgCO_3$) or a block of magnesium oxide (MgO) constitutes a very desirable standard, as such a block reflects a very pure and uniform white light.

At the opposite side of the lamp 2, and conveniently at the same distance from the lamp as the support 4, we mount a second support $4^a$, provided with a shield $5^a$ having a slit or aperture through which the surface 8 of the test sample 9 is exposed to the light from the lamp.

Between the lamp and the support 4 we preferably arrange a set of condensing lenses 10 and a similar set of lenses 11 is arranged between the lamp and the support $4^a$. In order to avoid overheating the sample and the standard, we preferably interpose cooling cells 12 and 13 at suitable points between the lamp and the respective supports.

We also interpose a pair of shutter or diaphragm devices 14 and 15 between the lamp and the supports 4 and $4^a$ respectively, said shutters being adapted to shut off more or less of the light from the lamp and thus to determine the relative amount of light reflected from the exposed surfaces of the standard and sample.

Referring to Figs. 4 and $4^a$ we have shown the shutter device 14 in detail, it being understood that the shutter device 15 may be of generally similar character. The shutter 14 comprises a pair of disk-like plates $14^a$ and $14^b$, respectively, mounted upon a stationary shaft $14^c$ carried by suitable brackets, not shown, on the base 1, the shaft $14^c$ being parallel to and substantially spaced from the axis of the lenses 10 and 11. The plate or disk $14^a$ is free to turn on the shaft $14^c$ while the disk or plate $14^b$ is fixed to the shaft and thus remains stationary. Each of the plates or disks $14^a$ and $14^b$ is preferably provided with alternating, opaque and transparent sectors. These sectors may conveniently be formed by punching out the material of the plates so as to leave openings 16 alternating with sectors which are not punched out. By turning the plate $14^a$ relatively to the plate $14^b$, the open sectors may be brought into registry, thus permitting a maximum amount of light to pass through the shutter device. On the other hand, by adjusting the plate properly, the registering portions of the open sectors may be diminished in area until, if desired, the opening is completely closed.

As shown in Figs. 4 and $4^a$ the plate $14^a$ is furnished with gear teeth 17 which mesh with a worm 18 on a rotary shaft 19 mounted in suitable bearings carried by the base of support 1. The means for rotating this shaft 19 is hereinafter more fully described.

The movable plate or disk of the shutter device 15 (see Fig. 5) preferably is provided with an arm $15^a$ to which there is connected a spring $15^b$ which tends to rotate the movable plate or disk in a given direction, for example, so as to provide the maximum aperture through the shutter device. A flexible cord $15^c$, or other suitable connecting element connects the arm $15^a$ with a cam follower $15^d$ (Fig. 1) which is actuated by a cam 20 on a shaft 65 hereinafter more fully described. By suitably shaping the cam 20 the shutter device 15 may be adjusted in one direction or the other at such varying speeds as may be desired.

We arrange a shaft 22 in suitable bearings carried by the base 1. This shaft 22 is substantially parallel to the optical axes of the lenses 10 and 11, that is to say, the shaft 22 is substantially perpendicular to the planes of the exposed surfaces 6 and 8 of the standard and test sample respectively. This shaft 22 is provided with a gear 23 meshing with a pinion upon the shaft of a synchronous electric motor 24 which is connected by suitable lead wires to the mains 25 and 26 which are furnished with alternating current of predetermined and substantially uniform period (for example, sixty cycles per second) from any suitable source.

The shaft 22 carries a flashing device 27 conveniently consisting of a disk of glass or other suitable material having alternating transparent sectors 28 and reflecting sectors 29. The reflecting surfaces of the sectors are turned toward the light reflected from the test sample 9 and the plane of the disk is so located that it makes substantially equal angles with beams of light $B^1$ and $B^2$ reflected, respectively, from the surfaces 6 and 8 of the standard 7 and sample 9. For properly directing these beams of light toward the disk, we preferably interpose lenses 30 and 31 in such beams. When a transparent sector 28 of the flasher disk 27 is properly positioned, the beam $B^1$ of light reflected from the standard 7 passes through the lens 30 and through such transparent sector, and thence through a narrow vertical slit 33 (on which it is preferably focused) in a shield 32 mounted upon the base and along the path L. When the beam from the standard is passing through the flasher disk, the beam $B^2$ from the sample also passes in the opposite direction through the disk, but without any useful effect. On the other hand, when the disk is positioned with its reflecting sector 29 in the path of the beam $B^2$, the latter is reflected and passes along the same path L as that which the beam $B^1$ formerly traversed. At this time, however, the latter beam is shut off by the opaque reflecting sector 29 so that only light from the sample 9 passes along the path L. The revolution of the shaft 22 with its disk 27 thus causes light reflected from the standard 7 and from the test sample 9 to pass in alternate flashes through the slit 37 along the path L.

The speed of the motor 24 and the gear ratio between the motor shaft and the shaft 22 is such that the alternations of light flashes from the standard and sample is at the same rate as the period of alternation of the electric current in the mains 25 and 26, that is to say, if sixty-cycle current be employed. flashes will be delivered by the disk 27 at the rate of 60 flashes per second from each.

These alternating flashes of light next pass through a lens 35 and into a dispersing prism 34, or other suitable and equivalent device, which disperses the light to form an extended spectrum band S. Preferably we interpose a lens 36 in the path of the light emerging from the prism 34 and the red end of the spectrum band is indicated at R and the violet end at V.

Preferably we mount the prism 34 or other dispersing device upon a rotary support 38 which may be slowly adjusted, either continuously or step by step, by means of suitable connections $38^a$ actuated by a cam $38^b$ on the shaft 65 already referred to. This adjustment of the support 38 with the lens or other dispersing device 34 has the effect of shifting the position of the spectrum band S in a longitudinal direction.

A shield 37 is fixedly mounted upon the base 1 and this shield has a narrow aperture 37 adapted to permit light from the spectrum band (of a limited range of wave length) to pass through and enter the window 39 of a photoelectric cell 40. While we here refer to a photoelectric cell, we wish it to be understood that this device may be replaced by any equivalent sensitively responsive element which may be found suitable for the purpose. If desired, this photoelectric cell or other sensitive device may be enclosed in a metal network or other suitable shielding means (not here shown) to prevent its response to extraneous electrical disturbances, as described and illustrated in our aforesaid application.

With the arrangement described, rotation of the shaft 65 with its cam $38^b$ swings the support 38 and thus shifts the position of the spectrum band S, with the result that the cell 40 is progressively exposed to light of varying wave length, beginning, for example, at one end of the spectrum band and slowly progressing, either continuously or intermittently, to the other end of the spectrum band. If, at any given wave length of light, the luminous energy received by the cell from the standard be greater than that received from the sample, for example, or vice versa, a fluctuation or pulsation in the current in the photoelectric cell is produced, and as the flashes of light from the standard and sample alternate at a determined rate, the current in the photoelectric cell 40 will have a similar rate of pulsation, and such pulsations will continue so long as there is any difference in intensity of luminous energy in successive flashes of light delivered to the cell. When the luminous energy from the sample and standard as delivered to the cell becomes equal, the current in the latter ceases to pulsate. The current in the photoelectric cell may thus be employed to indicate differences or equality in the intensity of light delivered from the standard and sample at any given wave length, but since the current in the photoelectric cell is extremely small, for example, of the order of $10^{-10}$ amperes, such current is of little value, either for observational purposes or for directly actuating any mechanical device, and accordingly we provided for amplifying this current. For amplifying this current we prefer to employ thermionic tubes or equivalent devices of well-known character, connected in suitable circuits as shown, for example, in Fig. 2 where we have indicated three amplifier stages $A^1$, $A^2$ and $A^3$. To avoid leakage over the surface of the photoelectric cell 40, we prefer to provide the latter with a guard ring $40^a$ of metal, connected into the amplifier circuit substantially as shown. Preferably we employ condensers C and X in the amplifier circuits, said condensers being so designed that only current of approximately sixty cycle, is amplified, current of substantially higher or lower frequency being by-passed or blocked, respectively.

The plate circuit of the amplifier $A^3$ includes the primary 42 of a transformer T whose secondary 43 is connected by suitable lead wires 44 and 45 to a reversible motor $M^2$. As here shown, the current from the secondary 43 of the transformer, is fed to the rotor of the motor $M^2$ and the field of this motor is supplied with alternating current from the mains 25 and 26. While, for certain reasons, we prefer this arrangement, that is to say, the connection of the secondary of the transformer to the rotor and the supply of the motor field with alternating current from the mains, we sometimes employ a reverse arrangement, and while we herein in some instances specifically claim the arrangement illustrated, we regard the reverse of this arrangement as its full equivalent and intend that such claims shall be read with this understanding.

The shaft of the motor $M^2$ carries a pinion 96 meshing with a gear 95 on the shaft 19 which, as above described, actuates the movable element $14^a$ of the shutter device 14 and thus, as the motor turns in one or the other direction, the shutter is opened or closed.

The shaft 65, previously referred to, is mounted to turn in bearings supported by the base 1 and this shaft carries a record drum 85 which may support a wax cylinder, a sheet of paper, or other surface adapted to receive a record. While we have here illustrated a rotating drum as the record element, we wish it to be understood that any other suitable type of record element may be employed such, for example, as a reciprocating table or plate adapted to carry a wax tablet or piece of paper, or a continuously moving ribbon or tape of suitable record material and of any desired length. As above described, the shaft 65 also carries the cams 20 and 38$^b$ for actuating the shutter 15 and for moving the dispersing device 34 so as to expose the photoelectric cell progressively to different parts of the spectrum band.

The shaft 65 is provided with a gear 86 meshing with a worm, not shown, on a shaft 87, carrying a gear 88 meshing with a pinion 89 on the shaft of an electric motor $M^1$ which receives alternating current from the mains 25 and 26.

The shaft 19 is provided with a screw-threaded portion 97 engaging a nut member 98 forming part of a reciprocating carriage 98$^a$ which supports a lever 99 (Fig. 3) overlying the surface of the drum 85 and carrying a stylus 100 or other suitable element adapted to cooperate with the drum or a piece of paper mounted thereon in producing a record.

The reciprocating carriage 98$^a$ is provided with a rearwardly extending portion having a slot 102 which receives a metallic guide rod 101 fixedly secured in insulating supports on the base member 1. The rod 101 preferably supports circuit breakers 103 and 104, respectively, which are disposed adjacent to opposite ends of the drum 85. These circuit-breaking devices are connected in circuit with the motor $M^2$, above described. Each circuit-breaking device comprises normally engaging contacts, one contact of each circuit breaker being movable and disposed in the path of a rod 105 mounted on the carriage, so that if the carriage approaches too near to one end or the other of the drum, the rod 105 will engage the corresponding circuit breaker and thus break the circuit through the motor $M^2$, thus avoiding accidental over-travel of the carriage.

As fully described in our aforesaid co-pending application Serial No. 195,848, filed June 1, 1927, we may, if desired provide for automatically intermitting the rotation of the drum while the setting of the shutter 14 is taking place, and we contemplate that similar mechanism may form a part of and be embodied in the structure herein illustrated.

In the operation of the device, the standard 7 (which, as above stated, is conveniently a block of magnesium carbonate having a smooth vertical face 6) is mounted on the support 4 and the sample to be tested is mounted on the support 4$^a$ with its surface 8 exposed through the slit in the shield 5$^a$. The lamp 2 is now lighted and its light passes in opposite directions through the condensing lenses 10 and 11 and illuminates the standard 7 and the sample 9. The light reflected from the surfaces 6 and 8 passes through the lenses 30 and 31, and, as the disk 27 rotates, this light is despatched in alternating flashes along the path L through the lens 35 to the dispersing device 34. After dispersion, the light passes through the lens 36 and forms a spectrum band at S, such band consisting of alternating spectra formed by the dispersion of the alternating flashes of light from the standard and sample. As indicated in Fig. 1, the support 38 is, for the moment, so adjusted that the violet end of the spectrum is opposite the slit 37$^a$, so that the photoelectric cell is exposed only to the violet component of light reflected from the standard and sample.

Assuming, for example, that the photoelectric cell is exposed at the red end of the spectrum and that the shutters 14 and 15 are so adjusted that a greater amount of red light is reflected from the standard 7 than from the sample 9, the energy represented by the flashes from the standard will be greater at the red end of the spectrum than the energy of the flashes from the sample. Thus, the photoelectric cell 40 will be subject to alternating variations in energy, and a pulsating current will be set up in this cell. Referring to Fig. 8 the line P diagrammatically indicates the character of this pulsating current in the photoelectric cell and it is to be remembered that the period of this current is identical with the period of alternation of the current supplied to the mains 25 and 26, due to the fact, as above described, that the flasher disk is driven by the motor 24 through a definite and predetermined gear ratio. The pulsating current from the cell 40 is amplified by means of the amplifier device above referred to, and flows through the primary 42 of the transformer T as an amplified pulsating current of the same period as the original current in the cell 40. This pulsating current, flowing in the primary of the transformer, induces alternating current of like period in the secondary 43 of the transformer, this alternating current being indicated diagrammatically at A in Fig. 8. The alternating current from the transformer T is delivered to the rotor of the motor $M^2$, and assuming that this alternating current in the rotor is of the same phase as the alternating current in the field of the motor, the motor shaft will be driven in a certain predetermined direction.

Assuming that the apparatus is properly designed, and that the red component of light from the standard 7 is greater than that from the sample, as above suggested, the rotation of the motor shaft turns the shaft 19 in such a direction as gradually to close the shutter 14, thus cutting off some of the light from the standard 7 and at the same time moving the carriage 98$^a$ longitudinally of the rotating drum 85 and causing the stylus 100 to impress a record mark upon the drum or upon a piece of paper carried by the drum. This movement of the motor M$^2$, the shaft 19, the stylus 100 and the shutter 14 continues until so much light has been cut off from the standard 7 that, at that particular part of the spectrum under observation, light of equal intensity is received by the photoelectric cell from the standard and sample. As soon as this condition of balance is attained, the current in the cell 40 immediately ceases to pulsate, whereupon amplification ceases and alternating current is no longer induced in the secondary 43 of the transformer. The rotor of the motor M$^2$ is now no longer supplied with current and this motor stops.

When the motor M$^2$ stops, the motor M$^1$ continues to turn the drum 85 and the shaft 65, thus turning the cam 38$^b$ and moving the support 38 to a new position. As above stated, the cam 38$^b$ may be so shaped as to cause slow, continuous movement of the support 38, or step by step or intermittent motion. In any event, the support 38, after stoppage of the motor M$^2$, is immediately moved so as to shift the relative position of the spectrum band S with respect to the photoelectric cell, thus exposing the cell to a new part of the spectrum. If at this new position the light from the standard and source be of different intensity, the above sequence of operations again takes place and if, under these new circumstances, the light from the standard 7 still is more intense than that from the sample, the motor M$^2$ will again move in the same direction, thus further closing the shutter 14.

Assuming, however, that in the new position of the photoelectric cell the light from the sample 9 is the more intense, a pulsating current will again be set up in the photoelectric cell, but by reason of the fact that the light from the sample 9 is reflected from the surfaces 29 of the disk which are 90° removed from those sectors of the disk which transmit light from the standard, the phase of the pulsations in the photoelectric cell will be shifted, as indicated diagrammatically, for example, at P$^1$ in Fig. 8. This shift in phase of the pulsating current in the photoelectric cell results in a corresponding shift of phase in the alternating current in the secondary of the transformer T, this change being indicated diagrammatically at A$^1$ in Fig. 8. Since the phase of the alternating current in the field of the motor M$^2$ remains unchanged, this shift of phase in the rotor current immediately results in reversal of the motor. This reversal of the motor M$^2$ causes the shaft 19 to turn in the opposite direction from that previously described, thus moving the carriage 98$^a$ in the opposite direction along the drum and at the same time gradually opening the shutter 14. This action continues until light from the standard 7, as delivered to the photoelectric cell, is of the same intensity as that from the sample, whereupon the current in the cell again ceases to pulsate and the motor M$^2$ stops.

The above operations are repeated with great rapidity as the photoelectric cell is progressively exposed from one end of the spectrum band to the other, and although this sequence of operations be repeated a great many times, for example, several hundred during the progression of the photoelectric cell from one end of the spectrum to the other, the entire operation may be completed in a period of the order of one minute. The combined movement of the drum 85 and the stylus 100 produces a curve upon the drum, or the paper mounted thereon, of the form indicated in Fig. 7, wherein the curves are of the general appearance produced by testing samples of a yellow and a blue tone respectively.

For the reason that the reflecting power of the silvered surfaces of the disk 27 varies somewhat at different portions of the spectrum, we have provided the adjusting device comprising the shutter 15 and the cam 20 for actuating it,—the cam being designed to compensate for the irregularly varying reflection values of the silvered surface at the different parts of the spectrum.

While the above arrangement is desirable and useful, we contemplate that various changes in the elements employed, as well as in their relative arrangement, may be made without departing from the spirit of the invention. For example, a diffraction grating may be substituted for the prism 34; the lamp 2 may be omitted if the standard and sample are self luminous; the cell 40 may be moved relatively to a spectrum band of fixed position, and in general any other suitable and equivalent parts and arrangement of parts may be substituted for those here specifically illustrated.

The invention, in its broader aspect, has been covered by claims in the Hardy application Ser. #274,448, filed May 2, 1928 and entitled "Method of and apparatus for comparing and recording radiant energy", also in the Hardy and Cunningham application Ser. #195,848 filed June 1, 1927 and entitled "Method of and apparatus for comparing and recording relative intensity of radiant energy".

We claim:

1. Means for comparing radiant energy from two sources, said means including a reversible electric motor, means for changing the phase relation of the current in the rotor and field respectively of the motor in accordance with reversals in relative intensity of energy from said sources, whereby the motor turns in one direction when one source is more energetic and in the opposite direction when the other source is more energetic and means actuated by said motor for varying the relative intensity of energy delivered by the two sources.

2. Means for comparing light intensities of two sources, said means including a reversible electric motor, means for supplying the field of the motor with alternating current of a predetermined frequency, means for supplying the rotor of said motor with alternating current of a similar frequency, means for varying the phase of the rotor current in accordance with changes in relative intensities of light from said sources thereby causing the motor to turn in one direction when one source is the brighter and in the opposite direction when the other source is the brighter.

3. Means for comparing light intensities from two sources, said means comprising a reversible electric motor, means for supplying the field of the motor with alternating current of a selected frequency, means for delivering alternate flashes of light from the two sources to a photo-electric cell, said flashes being at a rate corresponding to the period of said field current, thereby producing in said cell a current which pulsates at the same frequency as the current in the motor field, means utilizing the energy of the pulsating current for establishing an alternating current in the rotor of said motor, the relative intensities of the light from the two sources at any instant determining whether the rotor current shall be in the like or opposite phase to the field current.

4. Means for comparing light intensities at a selected wave length from two sources, said means including a reversible electric motor and a photo-electric cell, means for supplying the motor with alternating current of a predetermined frequency, means whereby the photo-electric cell is exposed to light of the selected wavelength from the two sources respectively in alternation at a rate equal to the period of the alternating current, thereby creating in said cell a current which pulsates at the same period but whose phase shifts with each reversal in relative intensity of the light received by the cell from the two sources, means for translating said pulsating current into alternating current of like frequency, and means for delivering said alternating current to the rotor of said motor.

5. Means for determining the color characteristics of a test sample, said means including a motor and apparatus for delivering beams of light from the sample and from a standard of comparison respectively to a sensitively responsive device in which an electric current pulsates in accordance with variations in luminous energy received by said device, means for dispersing said beams to form extended spectra, means for exposing the sensitive device alternately to a corresponding part of each spectrum, said alternations of exposure taking place at a selected uniform speed, means for translating the pulsating current into an alternating current synchronized with the period of pulsation of the pulsating current and means for energizing the motor by said alternating current.

6. Means for determining the color characteristics of a test sample, said means including means for delivering beams of light from said sample and from a standard of comparison onto a dispersing member which forms the beams into extended spectra, a sensitively responsive device exposed alternately to a corresponding part of each spectrum, said sensitively responsive device being characterized in that an electric current varies in accordance with the luminous energy received by said device, thereby producing in a primary circuit, pulsating current whose frequency corresponds to the rate of alternating exposure of said device to the two spectra, means employing the energy of said pulsating device to produce in a secondary circuit an alternating current synchronous with said pulsating current, and an electric motor energized by said alternating current.

7. Means for comparing and determining the color characteristics of light from a test sample and a standard of comparison, said means including means for illuminating said sample and standard of comparison, means for delivering reflected beams of light alternately in rapid succession at a predetermined rate from the sample and standard respectively to a dispersing device whereby alternately to form an extended spectrum of each respective beam, a photo-electric cell exposed at a series of points along one of said spectrum and at a corresponding series of points along the other spectrum, the current in said cell pulsating, so long as the light from the standard and sample varies in intensity, at a rate corresponding to the rate of alternation of the spectra, means for deriving alternating current from said pulsating current synchronized with the period of the pulsating current, and an electric motor energized by said alternating current.

8. Means for comparing light intensity from two sources, said means including a reversible electric motor and a photo-electric cell, means for supplying the field of the motor with alternating current of a predetermined period, means for dispersing light from each of said sources to form an extended spectra, means for exposing the photo-electric cell to corresponding points of said spectra in alternation, at a rate equal to the period of the alternating current, thereby creating in said cell a current which pulsates at the same frequency but whose phase shifts with each reversal in relative intensity of the light received from the two sources, means for translating said pulsating current into alternating current of like period, means for delivering said alternating current to the rotor of the motor and means whereby the motor varies the relative intensity of light from the two sources.

9. Means for comparing light intensity from two sources, said means including a reversible electric motor and a photo-electric cell, means for supplying the field of the electric motor with alternating current of a predetermined period, means for delivering flashes of light alternately from the two sources at a rate equal to the frequency of alternating current, means for dispersing said flashes of light to form extended spectra, means for exposing the photo-electric cell to alternating parts of said spectra thereby creating in said cell a current which pulsates at the same period but whose phase shifts with each reversal of relative intensity of light received by the cell from the two spectra, means for translating the pulsating current into alternating current of like period, means for delivering said alternating current to the rotor of the motor whereby said rotor is caused to turn in one direction or the other, depending upon the relative intensity of the light from the two sources received by the cell, and means for causing the motor to actuate a shutter whereby the relative intensity of light delivered from the two sources is determined.

10. Means for determining the color characteristics of a test sample, said means comprising a reversible electric motor and a photo-electric cell, means for supplying the field of the motor with alternating current of a predetermined frequency, means for illuminating the test sample and a standard to produce sources of light, means for alternately delivering the light from said sources to the photo-electric cell at a rate of alternation corresponding to the period of said current, thereby, whenever the intensity of light received by said cell from the two sources differs, producing pulsating current in said cell having a period equal to that of the alternating current but whose phase shifts with each reversal in relative intensity of the light from the two sources, means employing said pulsating current for establishing an alternating current of like period and delivering said current to the rotor of the motor, means whereby the motor actuates a device for varying the relative intensity of the illumination of the sample and standard until the current from the photo-electric cell becomes substantially constant.

11. Means for comparing color values, said means including a reversible electric motor and a photo-electric cell, means for supplying the field of the electric motor with alternating current of a predetermined period, means for delivering flashes of light alternately from a color sample and a standard of comparison to a dispersing device which forms an extended spectra, the period of alternation being equal to the period of alternating current, means for exposing the photo-electric cell to the alternate spectra from the sample and standard respectively, thereby, whenever the light received by the cell from the two sources is of unequal intensity, producing current in the cell which pulsates at the same period as said alternating current but whose phase shifts with each reversal in accordance with the intensity of the light received by the cell from the two sources, means for amplifying said pulsating current, means for translating said amplified pulsating current into alternating current of like period, means for delivering said last named alternating current to the rotor of the motor, means utilizing the movements of the rotor in varying the intensity of light delivered from the sample and the standard respectively, and a recording arrangement which is actuated in one direction or the other in accordance with the direction of rotation of the rotor.

12. Means for comparing color values, said means including a reversible electric motor and a photo-electric cell, means for supplying the field of the electric motor with alternating current of a predetermined period, means for delivering flashes of light alternately from a color sample and a standard of comparison, the period of alternation being equal to the period of the alternating current, means for dispersing said flashes to form extended spectra, which impinges on the photo-electric cell at a series of corresponding points in the alternating spectra, thereby, whenever the light received by the cell from the two sources is of unequal intensity, producing a current in the cell which pulsates at the same period as said alternating current, but whose phase shifts with each reversal in the relative intensity of the light received by the cell from the two sources, means for translating said pulsating current into alternating current of like period and delivering the alternating current to the rotor of the motor, means utilizing the rotation of the motor for actuating a shutter whereby the value of relative intensity of light delivered from the sample and standard respectively is varied, and an indicating means which is caused to move in one direction or the other in accordance with the direction of rotation of the rotor.

13. A colorimeter apparatus comprising means for delivering light of a predetermined wave length in alternating flashes from a test sample and a standard respectively to a photoelectric cell, a shutter for determining the amount of light reflected from said standard, a reversible rotary electric motor for actuating said shutter, index means also actuated by said motor, and means responsive to the current in the photoelectric cell for shifting the phase of the current in the rotor of the shutter-actuating motor relative to the phase of the current in the field of said motor, whereby to determine the direction of rotation of said rotor.

14. Apparatus comprising means for alternately delivering light of a given wave length from a test sample and a standard respectively to a photoelectric cell, a shutter for determining light delivered by said standard, a reversible motor for actuating said shutter, means supplying alternating current of predetermined period to the field of said motor, and independent means for supplying alternating current to the rotor of said motor, the phase of said latter current shifting in response to current variations in the photoelectric cell.

15. Apparatus of the class described comprising a photoelectric cell, means for exposing said cell alternately to light of a selected wave length received from a test sample and a standard of comparison respectively, the alternation of exposure being at a uniform and predetermined rate, means for varying the intensity of luminous energy delivered from the standard of comparison, a reversible motor for actuating said latter means, means supplying alternating current to the field of said motor, the period of said current corresponding to the rate of alternation of delivery of light from the sample and standard to the cell, and means for delivering alternating current to the rotor of said motor, said current having the same period as the current in the motor field but varying in phase in accordance with variations in current in the photoelectric cell.

16. Apparatus of the class described comprising a photoelectric cell, means for exposing said cell alternately to light received from two sources respectively, means for varying the amount of light delivered from at least one of said sources, a reversible motor for actuating said light varying means, means supplying the field of said motor with alternating current of a given period, means for amplifying the current from the photoelectric cell, and a transformer having a primary which is energized by the amplified current from the photoelectric cell, said transformer having a secondary which is in circuit with the rotor of the reversible motor.

17. Apparatus for comparing radiant energy from different sources, comprising a device in which electric current varies in accordance with variations in radiant energy received by said device, a reversible electric motor whose field is supplied with alternating current of predetermined period, means for alternately delivering flashes of energy from each of said sources to said sensitive device, the alternation of flashes being synchronized with the period of the alternating current, a transformer having a primary through which current pulsates in the same period as in the sensitively responsive device, and means connecting the secondary of said transformer to the rotor of the motor.

18. A colorimeter apparatus comprising means for directing light in alternate flashes from a test sample and a standard of comparison respectively onto a photoelectric cell, a shutter for adjusting the amount of light delivered from said standard, a reversible motor for actuating the shutter, a stylus also actuated by said motor, a movable record surface cooperating with the stylus, means for moving said record surface and for synchronously varying the wave length of the light to which the photoelectric cell is at any instant exposed, and means responsive to the current in the cell for determining the phase relation of the current in the rotor of the motor and in the field of the motor, respectively, thereby causing the motor to turn in one direction or the other in response to variations in current in the photoelectric cell.

19. A colorimeter apparatus comprising a photoelectric cell, means for delivering alternate flashes of light to said cell from a standard of comparison and a test sample, respectively, a shutter for varying the amount of light delivered by the standard, a stylus, a reversible electric motor for determining the movement of the stylus and shutter, a rotary drum cooperating with the stylus, means for turning the drum at a substantially uniform rate, a cam turning with the drum, means actuated by the cam for determining the wave length of light to which the photoelectric cell is at any time exposed, a transformer having a primary in which current fluctuates in synchronism with variations in current in the cell, the secondary of said transformer being in circuit with the rotor of said reversible motor, and means supplying the field of said motor with alternating current.

20. Apparatus for determining the color characteristics of light reflected from a test sample comprising a source of illumination, means for supporting the sample and a standard of comparison, means for directing light from the source of illumination onto the standard and the test sample respectively, means for dispersing light to form a spectrum, rotary means for alternately delivering flashes of reflected light from the test sample and standard respectively to the dispersing means, a photoelectric cell exposed to the spectra produced by the dispersing means, means for amplifying the current from said cell, a transformer having a primary through which such amplified current flows, a reversible motor to whose field alternating current of predetermined period is supplied, the current from the secondary of the transformer energizing the rotor of said motor, and means synchronized with the field current in the motor for actuating the flash-producing means.

21. Apparatus for comparing radiant energy from different sources comprising a photoelectric cell in which electric current varies in accordance with variations in radiant energy received by said cell, a reversible electric motor whose field is supplied with alternating current of predetermined period, means for delivering flashes of radiant energy from each of said sources to said cell, such alternations being synchronized with the period of the alternating current thereby, whenever the energy received by the cell from the two sources is of unequal intensity, creating a current in the cell which pulsates at the same period as said alternating current but which shifts with each reversal in relative intensity of energy received by the cell from the two sources, amplifying said pulsating current, causing the amplified current to pass through the primary of a transformer thereby creating an alternating current in the secondary of the transformer, such current having the same period as the pulsating current in the cell, causing the alternating current from the secondary of the transformer to pass through the rotor of the motor, and means actuated by the motor for varying the energy received by the cell from one of said sources until the current in the cell becomes substantially constant.

22. A colorimeter apparatus of the class described comprising means for illuminating a test sample and standard of comparison respectively, a flasher device for delivering alternating flashes of light from the standard and sample, means disposed in the paths of said flashes to disperse the light from the standard and sample to form alternating extended spectra, a photoelectric cell exposed to said spectra, a record surface, a stylus cooperating with said surface to form a record, a shutter for determining the relative intensity of light delivered from the sample and standard to the dispersing means, means connecting the stylus and shutter to move in synchronism, means for shifting the spectrum relative to the photoelectric cell, whereby to expose the latter progressively from one end of the spectrum to the other, a synchronous electric motor for driving the flash producing means, a motor for actuating the record element and the means for shifting the spectrum relative to the cell, and a reversible motor for actuating the stylus and shutter, means supplying alternating current of a predetermined period to the first-named motors for driving them and also to the field of the reversible motor, and independent means for supplying alternating current to the rotor of the reversible motor, the phase of said last-named alternating current shifting in response to change in current in the photoelectric cell.

23. A colorimeter for comparing light intensities derived from a plurality of sources comprising means for alternately dispersing the light from said sources to form spectra, a fixed light-sensitive electrical device, and automatic means for shifting each spectrum relative to said device whereby to expose said device progressively to various parts of each spectrum.

24. A colorimeter for comparing light intensities derived from a plurality of sources comprising a substantially stationary photoelectric cell, means for alternately forming spectra of light received from the two sources, and automatic means for shifting the position of the spector thereby exposing the photoelectric cell progressively to light waves of different length.

25. Apparatus of the class described comprising means for alternately dispersing light to form an extended spectrum, means for delivering light to the dispersing device, a photoelectric cell exposed to each spectrum formed by the dispersing device, and automatic means for shifting the dispersing device and cell relatively to one another whereby progressively to expose the cell to different parts of each spectrum.

26. Apparatus of the class described comprising a device for dispersing light to form an extended spectrum, means supporting said device to turn about a fixed axis, means for delivering beams of light from a plurality of sources to the dispersing device, a photoelectric cell exposed to each spectrum formed by the dispersing device, and an electric motor for turning the dispersing device thereby progressively exposing the cell to different parts of each spectrum longitudinally of the latter.

27. Apparatus of the class described comprising a prism for dispersing light to form an extending spectrum, means for supporting said prism to turn about a fixed axis, means for delivering beams of light from a plurality of sources to the dispersing prism, a photoelectric cell exposed to each spectrum formed by the prism, a cam for slowly rotating the prism whereby progressively to expose the cell to different parts of each spectrum longitudinally of the latter, and a motor for moving the cam.

28. Apparatus for determining the color characteristics of a test sample comprising means for delivering flashes of light alternately from two sources, the light from one source encountering a reflecting surface, a shutter for varying the intensity of the light which is reflected, and rotary cam means for adjusting the shutter to compensate for the variable reflecting factor of the reflecting surface when reflecting light to different wave lengths.

29. Apparatus for determining the color characteristics of a test sample, comprising means for supporting a sample and a standard of comparison, means for illuminating the sample and standard, a rotary disk having alternating sectors which are transparent and which are reflecting surfaces respectively, means for delivering light from the standard and sample in paths making substantially equal angles with opposite faces of the disk, means for rotating the disk whereby light from the standard and from the sample is transmitted in alternating flashes, and means for varying the amount of light delivered from the test sample to compensate for the variable reflection factor of the reflecting surface of the rotating disk at different wave lengths.

30. Apparatus for determining the color characteristics of a test sample comprising means for supporting a sample and a standard of comparison, means for illuminating the sample and standard, means for dispersing light to form a spectrum, a rotary disk having alternating sectors which are transparent and which are reflecting surfaces, respectively, means for delivering light from the standard and test sample in paths making substantially equal angles with plane of the disk, means for rotating the disk whereby to transmit light from the standard and sample in alternating flashes to the dispersing device, a shutter for varying the amount of light delivered to the test sample, and cam means for actuating said shutter whereby to compensate for the variable reflection factor of the reflecting surface of the rotating disk at different parts of the spectrum.

31. Means for comparing light intensities derived from two sources, said means including a reversible mechanism, means for reversing the operation of said mechanism in accordance with reversals in the relative intensity of energy derived from said sources thereby causing the mechanism to move in one direction when one source is the brighter and in the opposite direction when the other source is the brighter and means controlled by said mechanism for varying the relative intensity of energy delivered by the two sources.

32. Means for comparing and measuring the relative intensity of light derived from two sources, said means including a reversible mechanism, means for reversing the operation of said mechanism in accordance with reversal in the relative intensity of energy derived from said sources thereby causing the mechanism to move in one direction when one source is the brighter and in the opposite direction when the other source is the brighter, and means controlled by said mechanism for varying and equalizing the intensities of the energy delivered by the two sources and for indicating the amount of variation necessary to equalize the light energies.

33. In the art of comparing light intensities from two sources which employs a reversible motor, the method of supplying the field of the reversible electric motor with alternating current of a predetermined period, supplying the rotor of said motor with alternating current of similar period, and varying the phase of the rotor current in accordance with changes in relative intensity of light from said sources, thereby causing the motor to turn in one direction when one source is the brighter and in the opposite direction when the other source is the brighter.

34. In the art of comparing light intensities from two sources which employs a reversible motor, the method of supplying the field of the reversible electric motor with alternating current of a selected period, delivering alternate flashes of light from the two sources to a photo-electric cell, said flashes being at a rate corresponding to the period of said field current, thereby creating in said cell a current which pulsates at the same period as the current in the motor field, and utilizing the energy of said pulsating current in establishing an alternating current in the rotor of said motor, the relative intensities of the light from the two sources at any instant determining whether the rotor current shall be in the like or opposite phase to the field current.

35. In the art of comparing light intensities at a selected wave length from two sources which employs a reversible electric motor and a photo-electric cell, the method of supplying the field of the reversible electric motor with alternating current of a predetermined period, exposing the photoelectric cell to light of the selected wave length from the two sources respectively in alternation at a rate equal to the period of the alternating current, thereby creating in said cell a current which pulsates at the same period but whose phase shifts with each reversal in relative intensity of the light received by the cell from two sources, employing said pulsating current in creating an alternating current of like period, and delivering said alternating current to the rotor of the motor.

36. In the art of determining color characteristics of a test sample which employs a standard of comparison, an electric motor and a sensitively responsive device, the method of delivering beams of light from the sample and from a standard of comparison respectively, dispersing said beams to form extended spectra, exposing a sensitively responsive device, in which an electric current pulsates in accordance with variations in luminous energy received by said device, alternately to a corresponding part of each spectrum, said alternations of exposure taking place at a selected uniform speed, employing the energy of the pulsating current in establishing an alternating current synchronized with the period of pulsation of the pulsating current, and employing said alternating current in energizing an electric motor.

37. In the art of determining color characteristics of a test sample which employs a sensitively responsive device, an electric motor and a standard of comparison, the method of delivering beams of light from said sample and from a standard of comparison, dispersing said beams to form extended spectra, exposing the sensitively responsive device, in which an electric current varies in accordance with the luminous energy received by said device, alternately to a corresponding part of each spectrum, thereby creating in a primary circuit a pulsating current whose period corresponds to the rate of alternate exposure of said device to the two spectra, employing the energy of said pulsating current in creating in a secondary circuit an alternating current synchronous with the period of said pulsating current, and utilizing said alternating current in energizing the electric motor.

38. In the art of determining the color characteristics of light from a test sample which employs a dispersing means, a photoelectric cell, an electric motor and a standard of comparison, the method illuminating said sample and the standard of comparison, delivering reflected beams alternately and in rapid succession at a predetermined rate from the sample and standard respectively to the dispersing means whereby alternately to form an extended spectrum of each respective beam, exposing the photoelectric cell at a series of points along one of said spectra and at a corresponding series of points along the other spectrum, the current in said cell pulsating, so long as the light from the standard and sample varies in intensity, at a rate corresponding to the rate of alternation of the spectra, employing the energy of said pulsating current in establishing an alternating current synchronized with the period of the pulsating current and utilizing said alternating current in energizing the electric motor.

39. In the art of comparing light intensity from two sources which employs a reversible electric motor, a photoelectric cell, the method of supplying the field of the reversible electric motor with alternating current of a predetermined period, dispersing light from each of said sources to form extended spectra, exposing the photoelectric cell to corresponding points of said spectra, in alternation, at a rate equal to the period of the alternating current, thereby creating in said cell a current which pulsates at the same period but whose phase shifts with each reversal in relative intensity of the light received by the cell from the two sources, employing said pulsating current in creating an alternating current of like period, delivering said alternating current to the rotor of the motor, and employing the motor to vary the relative intensity of light from the two sources.

40. In the art of comparing light intensity from two sources which employs a reversible electric motor, a photoelectric cell and a shutter, the method of supplying the field of the reversible electric motor with alternating current of a predetermined period, delivering flashes of light alternately from the two sources at a rate equal to the period of the alternating current, dispersing said flashes of light to form extended spectra, exposing the photoelectric cell to corresponding parts of said spectra thereby creating in said cell a current which pulsates at the same period but whose phase shifts with each reversal of relative intensity of the light received by the cell from the two spectra, employing said pulsating current in creating an alternating current of like period, delivering said alternating current to the rotor of the motor whereby said rotor is caused to turn in one direction or the other, depending upon the relative intensity of the light from the two sources received by the cell, and causing the motor to actuate the shutter for determining the relative intensity of light delivered from the two sources.

41. In the art of determining the color characteristics of a test sample which employs a reversible motor, a photoelectric cell and a standard of comparison, the method of supplying the field of the reversible motor with alternating current of a predetermined period, illuminating the test sample and the standard to produce sources of light, alternately delivering light from said sources to the photoelectric cell at a rate of alternation corresponding to the period of said current, thereby, whenever the intensity of light received by said cell from the two sources differs, creating a pulsating current in said cell having a period equal to that of the alternating current but whose phase shifts with each reversal in relative intensity of the light from the two sources, employing said pulsating current in establishing an alternating current of like period and phase, delivering said alternating current to the rotor of the motor, and causing the rotor to vary the relative intensity of illumination of the sample and standard until the current in the photoelectric cell becomes substantially constant.

42. In the art of comparing color values which employs a photoelectric cell, a reversible electric motor, a standard of comparison and a recording element, the method of supplying the filed of the reversible motor with alternating current of a predetermined period, delivering flashes of light alternately from a color sample and the standard of comparison, the period of alternation being equal to the period of the alternating current, dispersing said flashes to form extended spectra, exposing the photoelectric cell to the alternating spectra from the sample and standard respectively, thereby, whenever the light received by the cell from the two sources is of unequal intensity, creating a current in the cell which pulsates at the same period as said alternating current but whose phase shifts with each reversal in relative intensity of the light received by the cell from the two sources, amplifying said pulsating current, employing said amplified current in creating an alternating current of like period, delivering said last-named alternating current to the rotor of the motor, utilizing the movement of the rotor in varying the intensity of the light delivered from the sample and standard, respectively, and causing the recording element to move in one direction or the other in accordance with the direction of rotation of the rotor.

43. In the art of comparing color values which employs a reversible electric motor, a photo-electric cell and a shutter, and an indicating means, the method of supplying the field of a reversible electric motor with alternating current of a predetermined period, delivering flashes of light alternately from a color sample and a standard of comparison, the period of alternation being equal to the period of the alternating current, dispersing said flashes to form extended spectra, progressively exposing a photo-electric cell at a series of corresponding points in the alternating spectra from the sample and standard respectively, thereby, whenever the light received by the cell from the two sources is of unequal intensity, creating a current in the cell which pulsates at the same period as said alternating current, but whose phase shifts with each reversal in relative intensity of the light received by the cell from the two sources, employing said pulsating current in creating an alternating current of like period, delivering said last-named alternating current to the rotor of the motor, utilizing the rotation of the rotor for actuating the shutter whereby to vary the relative intensity of light delivered from the sample and standard respectively, and causing the indicating means to move in one direction or the other in accordance with the direction of rotation of the rotor.

44. A colorimeter apparatus comprising means for delivering light of a predetermined wave length in alternating flashes from a test sample and a standard resepectively to a photoelectric cell, a shutter for determining the amount of light reflected from said standard, a reversible rotary electric motor for actuating said shutter, index means also actuated by said motor, and means responsive to the current in the photoelectric cell for shifting the phase of the current in the rotor of the shutter actuating motor relative to the phase of the current in the field of said motor, whereby to determine the direction of rotation of said rotor.

45. Apparatus comprising means for alternately delivering light of a given wave length from a test sample and a standard respectively to a photoelectric cell, a shutter for determining light delivered by said standard, a reversible motor for actuating said shutter, means supplying alternating current of predetermined period to the field of said motor, and independent means for supplying alternating current to the rotor of said motor, the phase of said latter current shifting in response to current variations in the photoelectric cell.

46. Apparatus of the class described comprising a photoelectric cell, means for exposing said cell alternately to light of a selected wave length received from a test sample and a standard of comparison respectively, the alternation of exposure being at a uniform and predetermined rate, means for varying the intensity of luminous energy delivered from the standard of comparison, a reversible motor for actuating said latter means, means supplying alternating current to the field of said motor, the period of said current corresponding to the rate of alternation of delivery of light from the sample and standard to the cell, and means for delivering alternating current to the rotor of said motor, said current having the same period as the current in the motor field but varying in phase in accordance with variations in current in the photoelectric cell.

47. Apparatus of the class described comprising a photoelectric cell, means for exposing said cell alternately to light received from two sources respectively, means for varying the amount of light delivered from at least one of said sources, a reversible motor for actuating said light varying means, means supplying the field of said motor with alternating current of a given period, means for amplifying the current from the photoelectric cell, and a transformer having a primary which is energized by the amplified current from the photoelectric cell, said transformer having a secondary which is in circuit with the rotor of the reversible motor.

48. Apparatus for comparing radiant energy from different sources, comprising a device in which electric current varies in accordance with variations in radiant energy received by said device, a reversible electric motor whose field is supplied with alternating current of predetermined period, means for alternately delivering flashes of energy from each of said sources to said sensitive device, the alternation of flashes being synchronized with the period of the alternating current, a transformer having a primary through which current pulsates in the same period as in the sensitively responsive device, and means connecting the secondary of said transformer to the rotor of the motor.

49. A colorimeter apparatus comprising means for directing light in alternate flashes from a test sample and a standard of comparison respectively onto a photoelectric cell, a shutter for adjusting the amount of light delivered from said standard, a reversible motor for actuating the shutter, a stylus also actuated by said motor, a movable record surface cooperating with the stylus, means for moving said record surface and for synchronously varying the wave length of the light to which the photoelectric cell is at any instant exposed, and means responsive to the current in the cell for determining the phase relation of the current in the rotor of the motor and in the field of the motor, respectively, thereby causing the motor to turn in one direction or the other in response to variations in current in the photoelectric cell.

50. A colorimeter apparatus comprising a photoelectric cell, means for delivering alternate flashes of light to said cell from a standard of comparison and a test sample, respectively, a shutter for varying the amount of light delivered by the standard, a stylus, a reversible electric motor for determining the movement of the stylus and shutter, a rotary drum cooperating with the stylus, means for turning the drum at a substantially uniform rate, a cam turning with the drum, means actuated by the cam for determining the wave length of light to which the photoelectric cell is at any time exposed, a transformer having a primary in which current fluctuates in synchronism with variations in current in the cell, the secondary of said transformer being in circuit with the rotor of said reversible motor, and means supplying the field of said motor with alternating current.

51. Apparatus for determining the color characteristics of light reflected from a test sample comprising a source of illumination, means for supporting the sample and a standard of comparison, means for directing light from the source of illumination onto the standard and the test sample respectively, means for dispersing light to form a spectrum, rotary means for alternately delivering flashes of reflected light from the test sample and standard respectively to the dispersing means, a photoelectric cell exposed to the spectra produced by the dispersing means, means for amplifying the current from said cell, a transformer having a primary through which such amplified current flows, a reversible motor to whose field alternating current of predetermined period is supplied, the current from the secondary of the transformer energizing the rotor of said motor, and means synchronized with the field current in the motor for actuating the flash producing means.

52. Apparatus for comparing radiant energy from different sources comprising a photoelectric cell in which electric current varies in accordance with variations in radiant energy received by said cell, a reversible electric motor whose field is supplied with alternating current of predetermined period, means for delivering flashes of radiant energy from each of said sources to said cell, such alternations being synchronized with the period of the alternating current thereby, whenever the energy received by the cell from the two sources is of unequal intensity, creating a current in the cell which pulsates at the same period as said alternating current but which shifts with each reversal in relative intensity of energy received by the cell from the two sources, amplifying said pulsating current, causing the amplified current to pass through the primary of a transformer thereby creating an alternating current in the secondary of the transformer, such current having the same period as the pulsating current in the cell, causing the alternating current from the secondary of the transformer to pass through the rotor of the motor, and means actuated by the motor for varying the energy received by the cell from one of said sources until the current in the cell becomes substantially constant.

53. A colorimeter apparatus of the class described comprising means for illuminating a test sample and standard of comparison respectively, a flasher device for delivering alternating flashes of light from the standard and sample, means disposed in the paths of said flashes to disperse the light from the standard and sample to form alternating extended spectra, a photoelectric cell exposed to said spectra, a record surface, a stylus cooperating with said surface to form a record, a shutter for determining the relative intensity of light delivered from the sample and standard to the dispersing means, means connecting the stylus and shutter to move in synchronism, means for shifting the spectrum relative to the photoelectric cell, whereby to expose the latter progressively from one end of the spectrum to the other, a synchronous electric motor for driving the flash producing means, a motor for actuating the record element and the means for shifting the spectrum relative to the cell, and a reversible motor for actuating the stylus and shutter, means supplying alternating current of a predetermined period to the first-named motors for driving them and also to the field of the reversible motor, and independent means for supplying alternating current to the rotor of the reversible motor, the phase of said last named alternating current shifting in response to change in current in the photoelectric cell.

Signed by us at Boston, Massachusetts, this 25th day of April, 1928, and at Stamford, Connecticut, this 16 day of April, 1928, respectively.

ARTHUR C. HARDY.
FREDERICK W. CUNNINGHAM.

CERTIFICATE OF CORRECTION.

Patent No. 1,806,199.  Granted May 19, 1931, to

ARTHUR C. HARDY.

It is hereby certified that error appears in the printed specification of the above numbered patent requiring correction as follows: Page 10, line 89, claim 24, for the misspelled word "spector" read spectra, and line 93, claim 25, strike out the word "alternately" and insert the same to follow the word "for" in line 94; and that the said Letters Patent should be read with these corrections therein that the same may conform to the record of the case in the Patent Office.

Signed and sealed this 7th day of July, A. D. 1931.

M. J. Moore,
Acting Commissioner of Patents.

(Seal)